July 17, 1956  N. C. GARDNER  2,754,874
ANTISKID DEVICES
Filed Oct. 31, 1952
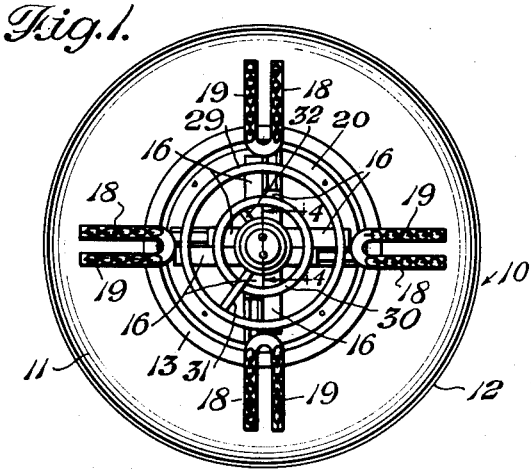
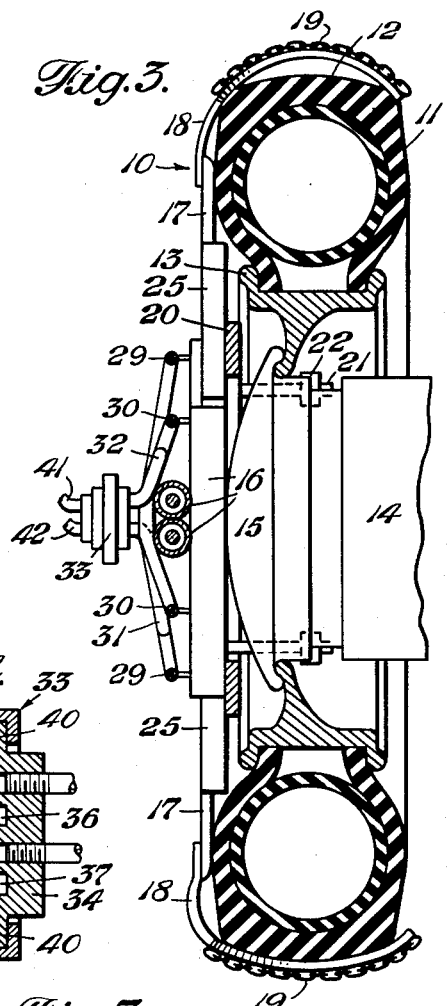
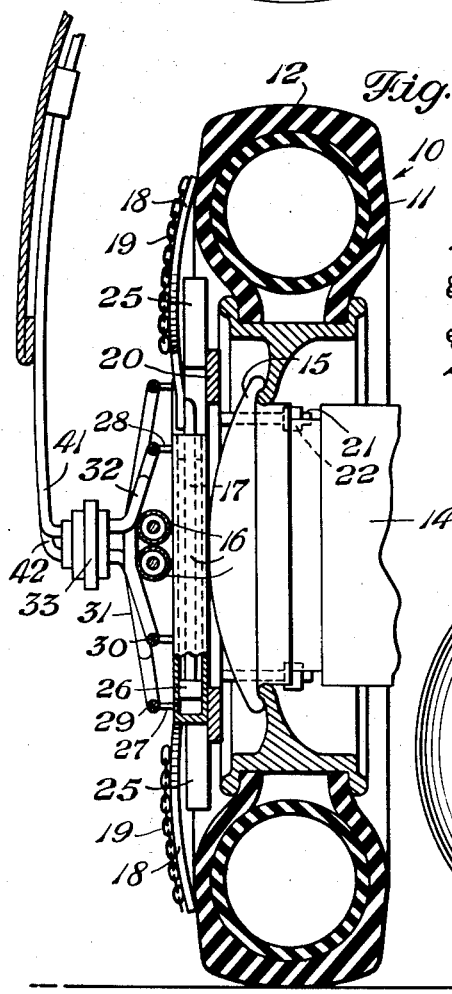
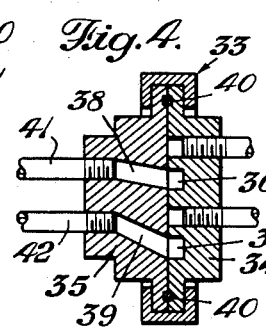
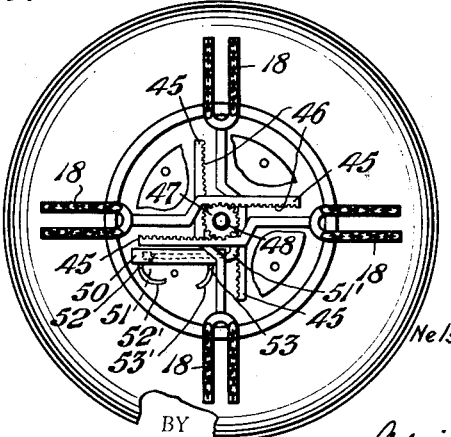
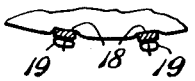
INVENTOR
Nelson C. Gardner
BY
Alvin Browdy
ATTORNEY

United States Patent Office 2,754,874
Patented July 17, 1956

2,754,874

ANTISKID DEVICES

Nelson C. Gardner, Silver Spring, Md.

Application October 31, 1952, Serial No. 317,909

8 Claims. (Cl. 152—216)

This invention relates to anti-skid devices, and more particularly to a device for use upon motor vehicle wheels.

In the past, many types of anti-skid devices have been proposed, but due to the difficulty of attachment to and removal from the wheel, none of the devices has been adopted on a large scale. The use of conventional chains which are manually attached to the tire and must be ridden upon until manually removed is inconvenient, as the chains must be removed after each use and attached again whenever snow or ice appears. It is well recognized that tire chains now in use cause considerable wear upon tire casings, particularly when running over paved streets, and also that the attachment of the chains is a disagreeable job.

An object of the present invention is to provide anti-skid devices that may be readily attached to the wheels of a motor vehicle, which may be carried by the vehicle at all times, and may be moved into position about the tread portion of the vehicle tire to prevent skidding of the vehicle.

A further object of the invention is to provide anti-skid devices that may be easily moved into operative position by the driver of the vehicle from the driver's seat.

A still further object of the invention is to provide anti-skid devices that may be mounted permanently upon the automobile wheels and may be readily moved into either operative or inoperative position.

A still further object of the present invention is to provide anti-skid devices for motor vehicle wheels that may be operated from the driver's seat either while the vehicle is in motion or while the vehicle is parked.

A still further object of the invention is to provide anti-skid devices for motor vehicles that can be applied to existing wheels without redesign of the wheels or other parts of the vehicle.

These and other objects are accomplished by the following invention wherein a plurality of flexible bars or the like roughly in the shape of the cross-section of the outer end of the tires are mounted alongside the wheel and are adapted to be moved into operative position about the tire tread. Other objects and the nature and advantages of the instant invention will be apparent from the following description taken in conjunction with the accompanying drawings, wherein:

Fig. 1 is a side elevation of the vehicle wheel showing the anti-skid devices in inoperative position;

Fig. 2 is a section through the vehicle wheel of Fig. 1;

Fig. 3 is a section through the vehicle wheel showing the anti-skid devices in operative position;

Fig. 4 is a fragmentary section taken along the line 4—4 of Fig. 1;

Fig. 5 is a detail showing the device in contact with the ground;

Fig. 6 is a detail showing a modified form of the device in contact with the ground; and Fig. 7 is a side elevation showing a modified form of operating mechanism.

Referring to the drawings, 10 designates a typical wheel of a motor vehicle including a resilient tire 11, having a tread portion 12, rim 13, brake drum 14 and hub cap 15. The anti-skid device which comprises the present invention includes a cylinder 16, a piston rod 17 which travels in the cylinder, and one or more flexible bars 18 attached to the outer end of the piston rod. The flexible bars 18 are provided with an anti-skid chain 19 attached thereto on the outer surface thereof. The anti-skid chains 19 may be either integrally or removably attached to the flexible bars. The flexible bars 18 are preferably made of spring tempered flat steel stock whose natural position is somewhat in the shape of a U or roughly in the shape of the cross-section of an automobile tire.

In the retracted position, the curved flexible member 18 is stretched out alongside the side wall of the tire, as best shown in Fig. 2. When moved to operative position, the flexible member assumes the position shown in Fig. 3, roughly following the contour of the tire and crossing the tire tread.

In a preferred embodiment of the invention, as illustrated in Figs. 1–5, each anti-skid device includes a pair of flexible bars 18 connected at the inner end at the point where the flexible bars are connected to the piston rod 17. However, it should be understood that a single flexible bar or more than two bars may be utilized on each device.

For best results, a plurality of anti-skid devices are utilized on each wheel. As illustrated, four such devices are provided on each wheel.

The cylinders 16 may be rigidly attached to the wheel in any suitable manner, as by brackets, clamps, bolts, or the like. In the embodiment of the invention illustrated, the four cylinders 16 are attached to the wheel by means of a ring member 20 that is rigidly bolted to the wheel by means of bolts 21 and nuts 22. The cylinders 16 are rigidly attached to the ring member 20, as by welding, and the entire assembly consisting of the ring member 20 with the cylinders, piston rods and flexible bars attached thereto can be attached to and removed from the wheel as a unit. The attachment of the assembly to the wheel may be readily accomplished by means of the four bolts 21 and nuts 22.

It should be understood that the device can be attached to the vehicle wheel at the beginning of winter and removed in the spring, and there is no need to remove the device after each use. The devices are merely moved to inoperative position and can be carried by the wheels in that position until they are again needed.

The ring member 20 is shown to be equipped with a plurality of guide members 25 which are attached to the ring member adjacent each piston rod 17, extending from a point close to the end of the cylinder 16 to a point beyond the rim 13 of the wheel. The guide members 25 serve to guide the travel of the piston rods 17 in their movement from inoperative to operative position, and prevent movement of the flexible bars 18 in a horizontal direction.

Movement of the devices from the inoperative to the operative position and vice versa may be accomplished by hydraulic action on the piston 26, which is mounted on the end of the piston rod 17 opposite from the end on which the flexible bars are mounted. Each cylinder 16 is provided with an opening near each end thereof to which is attached a feeder tube 27, 28 for conducting the hydraulic fluid to and from the cylinder.

In the embodiment of the invention shown, manifold feeders 29 and 30 are provided. Manifold feeder 29 is located adjacent to the end of the cylinder in which the piston is located when in inoperative position, and the manifold feeder 30 is located adjacent the end of the cylinder in which the piston is located when in operative position. The feeder tubes 27 connect the manifold feeder 29 to one end of the cylinder 16 and the feeder tubes 28 connect the manifold feeder 30 to the other end of the cylinder 16. Tubes 31 and 32 connect the manifold feeders 29 and 30, respectively, to the coupling 33. Coupling 33 is made up of a rotary member 34 that rotates with the wheel, and a fixed member 35. The rotary member 34 is provided with an inner groove 36 and an outer groove 37. The inner groove 36 is in communication with the tube 31, whereas the outer groove 37 is in communication with the tube 32. The fixed member 35 is provided with a passageway 38 in communication with the inner groove 36 and a passageway 39 in communication with the outer groove 37. The two portions of the coupling are in contact with a bearing member 40 to permit rotation of the rotary member 34 with respect to the fixed member 35. A pair of tubes 41, 42 connect the coupling passageways 38, 39 of the fixed member 35 with a master valve arrangement, not shown. The tubes 41, 42 may be attached to the underside of the fender 43 of the vehicle.

The master valve, not shown, is connected to the dashboard of the vehicle and by pushing a button or turning a knob, the flow of fluid in the tubes can be started to move each piston from one end of each cylinder to the other end thereof. The master valve may be operated either mechanically or by hydraulic or pneumatic means.

In operation, the master valve is actuated from the dashboard of the vehicle to direct the hydraulic fluid through tube 41, passageway 38, groove 36, and tube 31 to manifold ring 29 and thence through tubes 27 to the end of each cylinder 16. The hydraulic fluid forces the piston to the opposite end of the cylinder, thus causing the piston rod 17 to travel in guides 25, and the flexible bars 18 to assume the position of Fig. 3 across the tread of the tire. The natural U-shaped position of the flexible bar is thus assumed, with the skid chains in contact with the ground to prevent skidding of the vehicle or spinning of the wheel.

To return the devices to inoperative position, the master valve is actuated to direct the hydraulic fluid through tube 42, passageway 39, groove 37 and tube 32 to manifold feeder 30 and thence through tubes 28 to the end of each cylinder 16. The hydraulic fluid forces the piston back to the opposite end of the cylinder, thus causing the piston rod 17 to retract and move the flexible bars to the inoperative position shown in Fig. 2 alongside of the tire.

A modified form of the invention is shown in Fig. 7. In this form of the invention, the flexible bars 18 are each attached to a rack 45 which is provided with a plurality of teeth 46 on the end of the rack opposite from the end to which the flexible bars are attached. The rack teeth 46 are adapted to engage a spur gear 47 which is mounted at the central portion of the wheel. A nut 48 is integrally attached to the end of the spur gear 47 so that by manual rotation of the nut 48 and thereby the spur gear 47, the racks 45 are moved outwardly through the meshing teeth 46 to the operative position in which the flexible bars 18 straddle the tire tread 12. To provide for push button control of the anti-skid members, a cylinder 50 may be provided in which travels a piston rod 51. The piston rod 51 is bent into the shape of a U at the end opposite from that part thereof which travels in the cylinder 50 so that the portion 51′ external to the cylinder travels in a parallel direction with the piston rod 51 within the cylinder. The portion 51′ is provided with teeth on its outer surface which meshes with the spur gear 47. The cylinder 50 is provided with inlets and outlets 52 and 53 for conducting the fluid to and from the cylinder to actuate the piston, thereby actuating the spur gear 47 and the racks 45. Tubes 52′ and 53′ conduct the fluid from the cylinder to a coupling 33 which may be similar to that shown in Fig. 4 and previously described.

This modified form of the invention has certain advantages over the form of the invention shown in Figs. 1 to 3 in that only a single cylinder is required and the manifold feeders may be eliminated. However, other than in the manner of actuation of the flexible bars from the inoperative to the operative position and return, the basic invention is the same in both forms of the invention.

The anti-skid devices described herein can be applied to any existing vehicle wheel with no redesign of any parts of the wheel. Although the particular embodiment shown is applicable to most family-size automobiles, a heavier design would be required for buses and trucks. The principle can likewise be applied to tractors, airplanes and all types of wheeled vehicles. The device can be actuated from the driver's seat by push button control.

It is to be understood that any number of the anti-skid devices may be mounted about a vehicle wheel and that the devices upon both of the rear wheels may be operated simultaneously from the master valve, both while the vehicle is in motion and when at a standstill.

It is to be further understood that the flexible members described herein may be mounted on either the inner or outer surface of a wheel in any manner whatsoever, and the means for operating the flexible members could be mechanically operated as well as hydraulically. The use of braces on the inner or outer surface of the wheel is likewise contemplated where necessary to prevent rotation of the flexible members with respect to the wheel.

It will be obvious to those skilled in the art that various changes may be made without departing from the spirit of the invention and the invention is not limited to what is shown in the drawings and described in the specification, but only as indicated in the appended claims.

What is claimed is:

1. In combination with a vehicle wheel, a resilient tire, a flexible member which can be flexed from its normal curved cross-section to a substantially straight line position, said member having spring-like properties which return it to its normal shape, a friction means attached to the outer surface of said flexible member, and means for moving said flexible member outwardly radially along said resilient tire from a flexed straight line inoperative position alongside the side wall of said tire until it can attain its normal curved operative position straddling the tire across the tread thereof, and inwardly radially along said tire back to the flexed straight line inoperative position.

2. A device in accordance with claim 1, wherein said means for moving said flexible member comprises a hydraulic cylinder, a piston adapted to travel in said cylinder, a piston rod connected at one end to said piston and at the opposite end to said flexible member, and means for directing hydraulic fluid to and from said cylinder on opposite sides of said piston.

3. A device in accordance with claim 1, wherein said means for moving said flexible member comprises a rack attached at one end to said flexible member, teeth at the opposite end of said rack, a spur gear adapted to mesh with said teeth, and means for actuating said spur gear.

4. A device in accordance with claim 2, wherein a plurality of said flexible members, cylinders, pistons and piston rods are mounted on the vehicle wheel and the means for directing hydraulic fluid to and from said cylinders comprises a pair of circular manifold feeders connected to opposite ends of each said cylinder, and means for conducting fluid to and from said circular feeders.

5. A device in accordance with claim 3, wherein the means for actuating said spur gear includes a nut integral with the end of said spur gear whereby mechanical rotation of said nut results in rotation of said spur gear and movement of said rack and flexible member to the operative position.

6. A device in accordance with claim 3, wherein said means for actuating said spur gear includes a cylinder, a piston adapted to travel in said cylinder, a piston rod connected at one end to said piston, teeth at the other end of said piston rod, said teeth being in engagement with said spur gear, and means for directing fluid to and from said cylinder on opposite sides of said piston to move said piston rod and thereby actuate said spur gear.

7. A device in accordance with claim 6, wherein said piston rod is bent into the shape of a U whereby the portion of the piston rod containing said teeth travels parallel to the portion of the piston travelling within said cylinder.

8. An anti-skid device for wheels of vehicles comprising in combination with said vehicle wheel, a resilient tire, a flexible member which can be flexed from its normal curved cross-section to a substantially straight line position, said member having spring-like properties which return it to its normal shape, a friction means attached to the outer surface of said flexible member, a piston rod connected at one end to said flexible member, a piston connected to the other end of said piston rod, a hydraulic cylinder in which said piston travels, a ring attached to said wheel, said cylinder being mounted on said ring, and means for directing hydraulic fluid to and from said cylinder on opposite sides of said piston to move said flexible member outwardly radially along said resilient tire from a flexed straight position alongside the side wall of said tire until it can attain its normal curved position straddling the tire across the tread thereof.

References Cited in the file of this patent
UNITED STATES PATENTS

| | | |
|---|---|---|
| 2,212,076 | Rollings | Aug. 20, 1940 |
| 2,494,850 | Williams | Jan. 17, 1950 |
| 2,530,108 | Whichard | Nov. 14, 1950 |
| 2,532,309 | Hoffman | Dec. 5, 1950 |